United States Patent [19]

Johnson

[11] Patent Number: 4,877,983

[45] Date of Patent: Oct. 31, 1989

[54] MAGNETIC FORCE GENERATING METHOD AND APPARATUS

[76] Inventor: Howard R. Johnson, Box 199, 314 N. Main, Blacksburg, Va. 24060

[21] Appl. No.: 799,618

[22] Filed: Nov. 19, 1985

[51] Int. Cl.⁴ .......................................... H02K 41/00
[52] U.S. Cl. .............................. 310/12; 310/152
[58] Field of Search ...................... 310/152, 12, 46

[56] References Cited

U.S. PATENT DOCUMENTS

| 4,074,153 | 2/1978 | Baker et al. | 310/12 |
| 4,151,431 | 4/1979 | Johnson | 310/12 |

Primary Examiner—R. Skudy
Attorney, Agent, or Firm—Fleit, Jacobson, Cohn, Price, Holman & Stern

[57] ABSTRACT

A permanent magnet armature is magnetically propelled along a guided path by interaction with the field within a flux zone limited on either side of the path by an arrangement of permanent stator magnets.

6 Claims, 3 Drawing Sheets

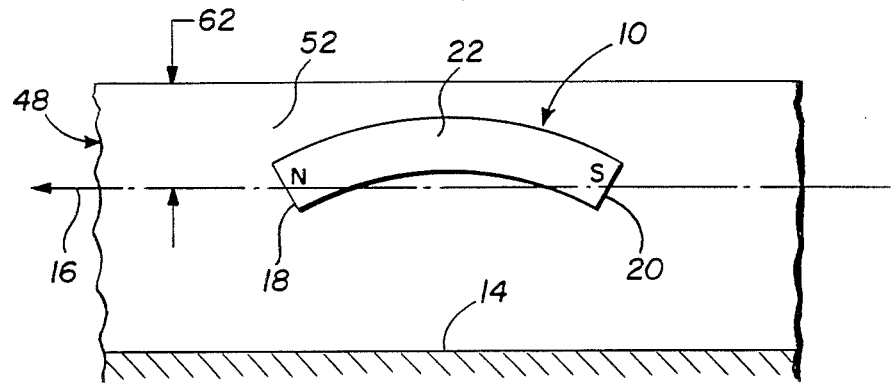
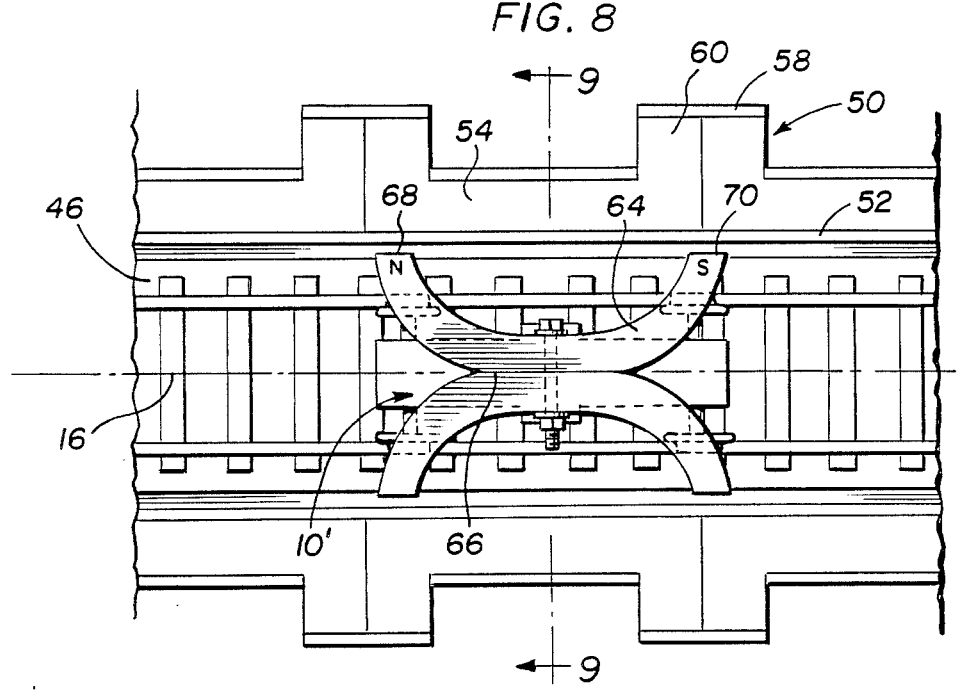
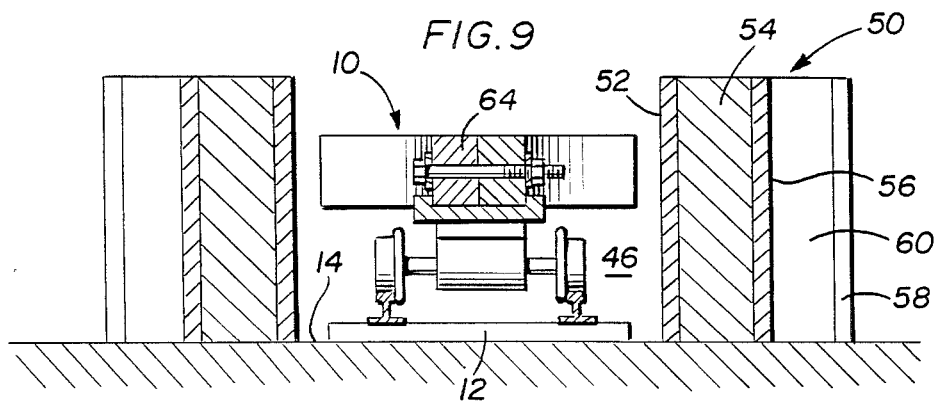

MAGNETIC FORCE GENERATING METHOD AND APPARATUS

BACKGROUND OF THE INVENTION

This invention relates in general to the use of permanent magnets to generate unidirectional propelling forces.

The generation of unidirectional propelling forces by permanent magnets is already known and recognized in U.S. Pat. Nos. 4,151,431 and 4,215,330 to Johnson and Hartmen, respectively, by way of example. According to applicant's own prior Pat. No. 4,151,431, such forces are generated by magnetic interaction between a curved magnet bar of an armature guided for movement along a circular path and an arrangement of spaced stator magnets having pole faces of one polarity facing the armature on one side thereof parallel to the path of movement.

It is therefore an important object of the present invention to provide certain improved stator arrangements of permanent magnets interacting with a permanent magnet armature for unidirectional propulsion thereof in a novel manner believed to be more efficient.

SUMMARY OF THE INVENTION

In accordance with the present invention, the armature magnet is guided along a path through a magnetic flux zone limited on opposite sides of the path by an arrangement of magnetic pole surfaces of one polarity on stator magnets. According to one embodiment, the flux zone is formed by spaced gate assemblies of magnets having exposed pole faces of one polarity in a plane perpendicular to the armature path from which a magnetic field extends to the opposite pole faces and a ring magnet fixed to such opposite pole faces of the other polarity, with a radially inner pole surface of the same polarity producing a magnetic field perpendicular to the first mentioned field to their opposite radially outer pole surfaces.

According to another embodiment, the flux zone is formed between continuous confronting pole surfaces of one polarity on stator magnets arranged to produce a magnetic field of varying intensity along the armature path.

In yet another embodiment, at least two curved bar magnets are interconnected to form the armature with two pairs of pole faces spaced along the armature path.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a simplified side view through the flux zone shown in FIGS. 4, 5 and 6 with the armature bar magnet positioned therein.

FIG. 8 is a top plan view of an installation in accordance with yet another embodiment.

FIG. 9 is an enlarged partial sectional view through a plane indicated by section line 9—9 in FIG. 8.

DETAILED DESCRIPTION OF THE PREFERRED EMBODIMENTS

Figure 1:
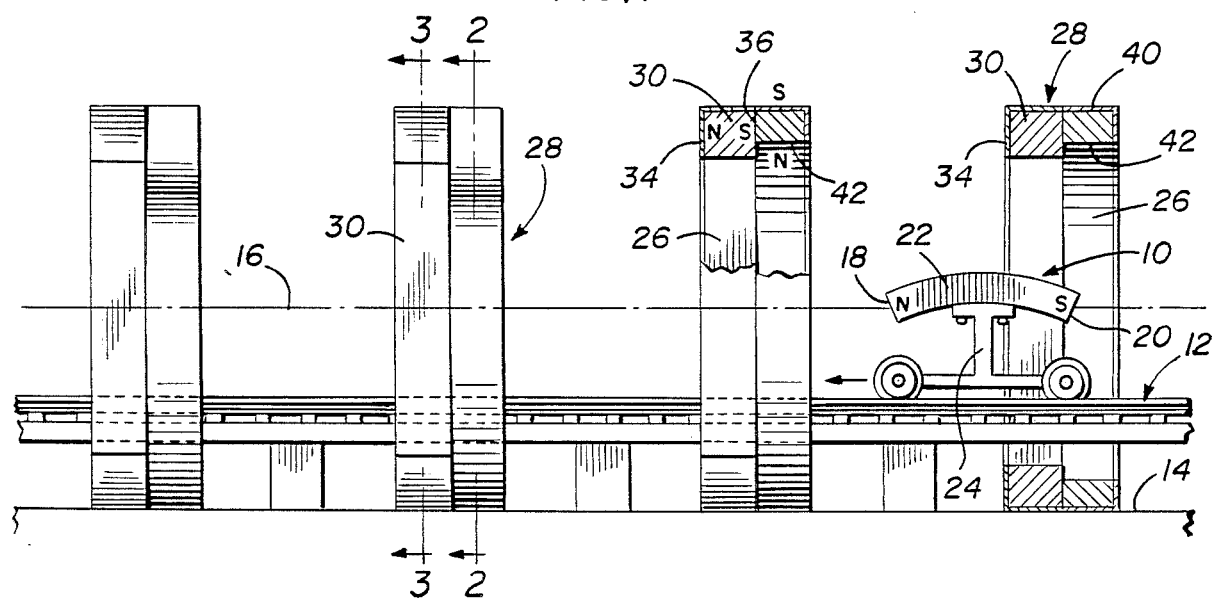
FIG. 1 is a somewhat schematic side elevational view showing an installation of the present invention in accordance with one embodiment, with parts broken away and shown in section.

Referring now to the drawings in detail, FIG. 1 illustrates one embodiment of the invention in which a magnetic armature generally referred to by reference numeral 10 is unidirectionally propelled along a predetermined path established by a motion guiding track 12 fixed to a frame or support 14. The path is represented by a line 16 extending through pole faces 18 and 20 of opposite polarity at the longitudinal ends of a curved armature bar magnet 22. The armature 10 in the illustrated example includes a wheeled vehicle mount 24 to which the armature magnet 22 is fixedly secured with the pole faces 18 and 20 converging toward the guiding track 12. The pole faces 18 and 20 are furthermore orientated so that the magnetic field extending between pole faces 18 and 20 is movable therewith within a flux zone 26 limited in surrounding relation to the guided path at spaced locations by stator gate assemblies 28 formed by permanent magnets fixed to the frame support 14.

Figure 2:
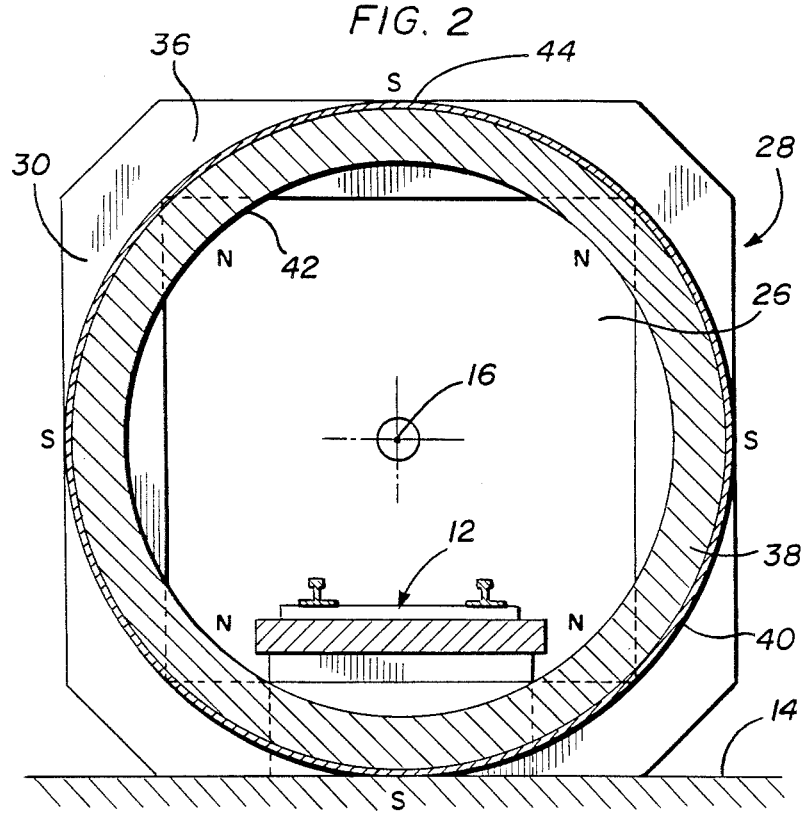
FIG. 2 is a transverse sectional view taken substantially through a plane indicated by section line 2—2 in FIG. 1.
Figure 3:
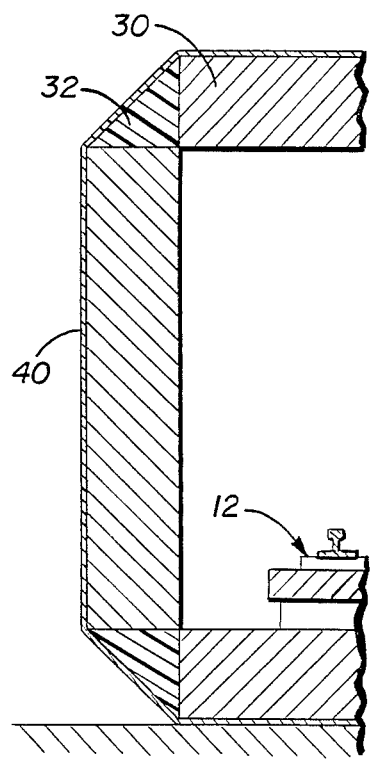
FIG. 3 is an enlarged partial sectional view taken substantially through a plane indicated by section line 3—3 in FIG. 1.
Figure 4:
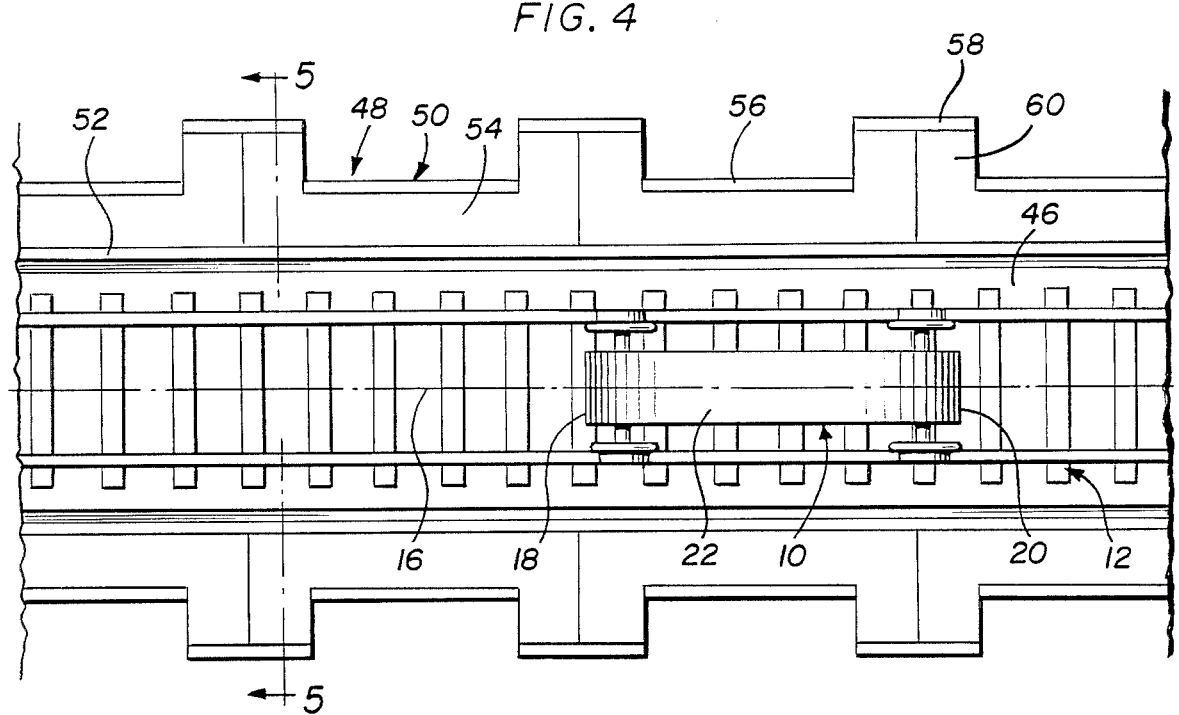
FIG. 4 is a top plan view of an installation in accordance with another embodiment of the invention.
Figure 5:
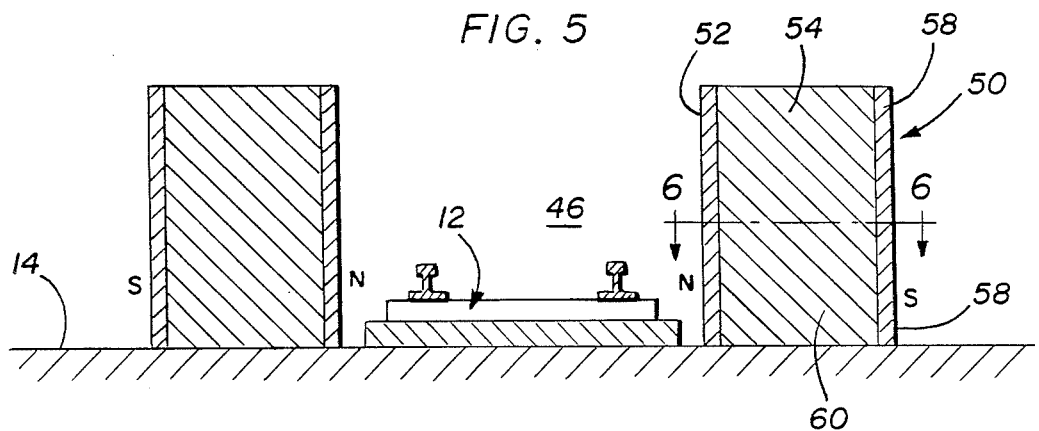
FIG. 5 is a sectional view taken substantially through a plane indicated by section line 5—5 in FIG. 4.
Figure 6:
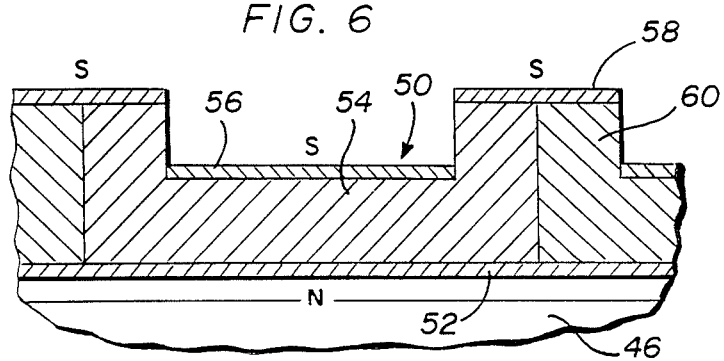
FIG. 6 is a sectional view taken substantially through a plane indicated by section line 5—5 in FIG. 5.

Each of the stator gate assemblies 28 as shown in FIGS. 1-3, includes four bar magnets 30 interconnected at corners by non-magnetic elements 32, such as triangular wooden blocks as more clearly seen in FIG. 3, to form a rectangular enclosure in surrounding relation to the track 12. Pole faces 34 and 36 between which a stationary magentic field extends are formed on the bar magnets substantially aligned with parallel spaced planes in perpendicular intersecting relation to the path line 16. The pole face 34 of one polarity (north) is effective through its magnetic field to magnetically interact with the magnetic field of the armature magnet 22 causing unidirectional propulsion of the armature 10 as actually observed during tests. Such magnetic interaction is obviously influenced by the pole face 36 of opposite polarity (south) abutting and fixed to an annular or circular ring magnet 38 magnets 30. The interconnected and 38 may be held in assembled relation by an outer skin or sheathing 40 as shown in FIG. 3.

The ring magnet 38 has a radially inner pole surface 42 of the same polarity (north) as that of the pole faces 34 to interact with the other pole faces 36 as aforementioned, to the exclusion of the radially outer pole surface 44. The obvious effect of said arrangement is to exert a net magnetic force on the armature magnet 22 causing the observed continuous, unidirectional propulsion thereof through the gate assemblies 28. Such assemblies 28 are spaced apart distance dependent on the magnetic field intensity or strength of the permanent magnets 30 and 38 which dictate the effective axial extent of the aforementioned magnetic fields associated with the assemblies 28 and the armature magnet 22.

FIGS. 4-7 illustrate another embodiment of the invention utilizing the same type of movable armature 10 guided along a predetermined path by a frame mounted track 12 extending through a flux zone 46 established by another type of permanent magnet stator arrangement, generally referred to by reference numeral 48. The stator 48 includes a pair of permanent magnet assemblies 50 extending in parallel spaced relation to each other on opposite sides of the armature path established by the track 12. Each assembly 50 is a mirror image of the other so as to expose continuous confronting pole surfaces formed by a magnetic layer material 52 such as Neodymium, mounted on interconnected ceramic bodies 54. The confronting pole surfaces of the magnetic layers 52 are of like polarity (north), opposite to the polarity of the pole surface of magnetic layer sections 56 and 58 made of Samarium Cobalt, for example, and carried on the ceramic bodies 54. The bodies 54 have transversely extending flange portions 60 at the abutting ends so as to mount the layer sections sections 58 laterally outwardly of layer sections 56 as more clearly seen in FIGS. 4 and 6 to thereby vary the magnetic field intensity along the guided armature path within the limited flux zone 46 in which the magnetic fields of the stator assembly 48 interact with the magnetic field of bar magnet 22.

The curved armature magnet 22 is orientated within the flux zone 46 between the confronting pole surfaces on 52 as depicted in FIG. 7, with the pole faces 18 and 20 converging toward the track 12 as previously described in connection with FIGS. 1-3. However, it was found that maximum propelling thrust is produced by optimum location of the path line 16 through the pole faces 18 and 20 a distance 62 closer to the upper edge of surface layer 52 than the lower edge on the frame support 14.

FIGS. 8 and 9 illustrate yet another embodiment of the invention involving the same type of permanent magnet stator arrangement 50 as described with respect to FIGS. 4-7. a modified form of armature 10' is featured in FIGS. 8 and 9, including two curved armature magnets 64 that are mirror images of each other with respect to an intermediate abutting portion 66. The magnets 64 are interconnected at the abutting portion 66 in alignment with a plane containing the path line 16 centrally between the confronting pole surfaces on 52. The end pole faces 68 and 70 for each magnet 64, are aligned with a plane in parallel spaced relation between the path line 16 and the pole surface on 52. With the number of pole faces thereby doubled for the armature, a higher and more efficient propelling thrust may be achieved.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restorted to, falling within the scope of the invention.

What is claimed as new is as follows:

1. In combination with a movable armature, means for guiding movement of the armature along a predetermined path and a permanent armature magnet having magnetic poles of opposite polarity spaced from each other along said path to establish a magnetic field of limited extent movable with the armature and magnetic stator means for establishing a stationary magnetic flux zone along said path, the improvement comprising flux emitting surfaces of one polarity mounted on the stator means on opposite sides of said path for limiting said flux zone through which said path extends and means mounting the permanent armature magnet on the armature with the poles thereof orientated relative to said flux emitting surfaces on the stator means for unidirectionally propelling the armature along said path through the limited zone in response to magnetic interaction between the movable magnetic field and the limited flux zone, said magnetic stator means including a plurality of magnetic gate assemblies fixedly spaced from each other along said path and respectively establishing stationary magnetic fields, each of said gate assemblies including a plurality of interconnected bar magnets substantially bordering said limited flux zone exposing pole faces of opposite polarity in parallel spaced planes intersected by said path, and magnetic means connected to said interconnected bar magnets exposing one of the flux emitting surfaces of said one polarity perpendicular to said parallel planes for magnetic interaction of the stationary magnetic fields.

2. The combination of claim 1 wherein said armature magnet is curved between end faces at which said poles of opposite polarity are located, the end faces being orientated by the mounting means in converging relation to each other toward the guiding means.

3. In combination with a movable armature, means for guiding movement of the armature along a predetermined path and a permanent armature magnet having magnetic poles of opposite polarity spaced from each other along said path to establish a magnetic field of limited extent movable with the armature and magnetic stator means for establishing a stationary magnetic flux zone along said path, the improvement comprising flux emitting surfaces of one polarity mounted on the stator means on opposite sides of said path for limiting said flux zone through which said path extends and means mounting the permanent armature magnet on the armature with the poles faces thereof orientated relative to said flux emitting surfaces on the stator means for unidirectionally propelling the armature along said path through the limited zone in response to magnetic interaction between the movable magnetic field and the limited flux zone, said armature magnet being curved between end faces at which said poles of opposite polarity are located, the end faces being orientated by the mounting means in converging relation to each other toward the guiding means.

4. In combination with a movable armature, means for guiding movement of the armature along a predetermined path and a permanent armature magnet having magnetic poles of opposite polarity spaced from each other along said path to establish a magnetic field of limited extent movable with the armature and magnetic stator means for establishing a stationary magnetic flux zone along said path, the improvement comprising flux emitting surfaces of one polarity mounted on the stator means on opposite sides of said path for limiting said flux zone through which said path extends and means mounting the permanent armature magnet on the armature with the poles thereof orientated relative to said flux emitting surfaces on the stator means for unidirectionally propelling the armature along said path through the limited zone in response to magnetic interaction between the movable magnetic field and the limited flux zone, said magnetic stator means including a pair of permanent magnet assemblies having continuous, confronting pole faces of said one polarity bordering said limited zone, each of said assemblies having means for varying magnetic field intensity in the flux zone along said path, and a second armature magnet connected to the first mentioned armature magnet in mirror image relation thereto.

5. The combination of claim 4 wherein said armature magnet is curved between end faces at which said poles of opposite polarity are located, the end faces being orientated by the mounting means in a plane parallel to said path.

6. In combination with a movable armature, means for guiding movement of the armature along a predetermined path and a permanent armature magnet mounted on the armature having magnetic poles of opposite polarity spaced from each other along said path, the improvement comprising a plurality of permanent magnet gate assemblies mounted in spaced relation to each other along said path establishing interacting stationary magnetic fields along said path, each of said assemblies including stator magnets interconnected in surrounding relation to said path and having pole faces of opposite polarity aligned with parallel planes intersected by said path and magnetic means fixed to the pole faces aligned with one of the parallel planes for interaction of the armature magnet with said stationary magnetic fields for unidirectional propulsion of the armature along said path, said magnetic means being an annular magnet having a radially inner pole surface of one polarity enclosing a magnetic flux zone through which said path extends.

* * * * *